United States Patent [19]

Nakamura et al.

[11] Patent Number: 4,767,465
[45] Date of Patent: Aug. 30, 1988

[54] PIGMENT COMPOSITION

[75] Inventors: Michiei Nakamura, Soka; Hitoshi Takeuchi, Showa; Tetsujiro Takahashi, Koshigaya; Yoshitake Kori, Ageo; Minoru Takizawa, Koshigaya; Takamitsu Shinoda, Kashiwa; Shojiro Horiguchi, Omiya, all of Japan

[73] Assignee: Dainichiseika Color & Chemicals Mfg. Co., Ltd., Tokyo, Japan

[21] Appl. No.: 84,192

[22] Filed: Aug. 12, 1987

[30] Foreign Application Priority Data

Aug. 20, 1986 [JP] Japan .................................. 61-192918

[51] Int. Cl.$^4$ .............................................. C09C 3/00
[52] U.S. Cl. .................... 106/413 M; 106/23; 106/476; 106/502; 106/499
[58] Field of Search ................ 106/23, 308 M, 308 Q; 524/599, 600, 601, 604, 605

[56] References Cited

U.S. PATENT DOCUMENTS

| | | | |
|---|---|---|---|
| 3,917,639 | 11/1975 | Poget et al. | 106/23 |
| 4,001,035 | 1/1977 | Ito et al. | 106/308 M |
| 4,224,212 | 9/1980 | Topham | 524/602 |
| 4,525,524 | 6/1985 | Tung et al. | 524/601 |
| 4,639,272 | 1/1987 | Ito et al. | 106/308 M |

Primary Examiner—Paul Lieberman
Assistant Examiner—Helene Kirschner
Attorney, Agent, or Firm—Oblon, Fisher, Spivak, McClelland & Maier

[57] ABSTRACT

A pigment composition contains a pigment and a dispersant. The dispersant is a polyester compound which contains, per molecule, a residuum of at least two benzene rings coupled together, an aromatic ring having at least 8 carbon atoms or a heterocyclic ring having at least 8 carbon atoms, and at least one ester bond as a principal bond.

3 Claims, No Drawings

PIGMENT COMPOSITION

BACKGROUND OF THE INVENTION

1. Field of the Invention

This invention relates to a novel pigment composition, and more specifically to a pigment composition which contains as a pigment dispersant or a flushing agent a polyester compound containing a residuum of coupled benzene rings, an aromatic ring having a high carbon number or a heterocyclic ring having a high carbon number and is useful as a coloring material such as paint, printing ink or synthetic resin colorant.

2. Description of the Prior Art

In the production of paints and printing inks, lecithin, a phospholipid, has heretofore been used by way of example as a dispersant or a flushing agent upon dispersing pigments in paint vehicles or printing ink varnishes or upon flushing pigments from aqueous filter cakes into oil vehicles or oil varnishes.

Lecithin is however susceptible to oxidation and rancidity and hence involves a potential problem of property changes or rotting, because it is a phospholipid of natural origin. There is thus an outstanding need for a dispersant or a flushing agent which has better stability and properties than lecithin.

SUMMARY OF THE INVENTION

An object of this invention is therefore to provide a pigment composition free from the above-described problems of pigment compositions which make use of lecithin or the like as a dispersant or a flushing agent.

In view of the above-described drawbacks of conventional pigment dispersants or flushing agents, the present inventors have carried out a wide variety of investigation with a view toward developing a compound which is compatible not only with various vehicles and varnishes but also with pigments. As a result, it has been found that a polyester compound containing a residuum of coupled benzene rings, an aromatic ring having a high carbon number or a heterocyclic ring having a high carbon number exhibits excellent properties and effects as a dispersant for pigments, leading to completion of this invention.

In one aspect of this invention, there is thus provided a pigment composition containing a pigment and a dispersant, characterized in that said dispersant is a polyester compound which contains, per molecule, a residuum of at least two benzene rings coupled together, an aromatic ring having at least 8 carbon atoms or a heterocyclic ring having at least 8 carbon atoms and at least one ester bond as a principal bond.

The polyester compound, which is useful as a dispersant in the present invention and contains a residuum of at least two benzene rings coupled together, an aromatic ring having at least 8 carbon atoms or a heterocyclic ring, is free from the danger of property changes and rotting due to oxidation and/or rancidity such as those observed conventionally from the use of lecithin, a phospholipid of natural origin, as a dispersant for pigments in the field of coloring materials such as paints, printing inks and plastic colorants. The polyester compound has excellent stability and shows superb effects, for example, in modifying pigment surfaces or dispersing pigments in media.

The polyester compound, which is useful as a dispersant in the present invention and contains a residuum of at least two benzene rings coupled together, an aromatic ring having at least 8 carbon atoms or a heterocyclic ring, is a hydrophobic compound and contains at least one ester bond. Owing to properties such as electron attracting property of the ester bond and lipophilicity of the coupled benzene rings, the aromatic ring having the high carbon number or the heterocyclic ring having the high carbon number and a hydrocarbon chain, the polyester compound is adsorbed on the surface of a pigment to improve wetting properties of the pigment to a medium, whereby the dispersibility of the pigment in the medium is improved and the resulting dispersion has good flowability. The polyester compound also renders the surface of a pigment lipophilic or hydrophobic when employed as a flushing agent upon flushing an aqueous filter cake of the pigment, so that the pigment can be flushed easily and efficiently.

The above and other objects, features and advantages of the present invention will become apparent from the following description and the appended claims.

DETAILED DESCRIPTION OF THE INVENTION AND PREFERRED EMBODIMENTS

The present invention will hereinafter be described in detail. The dispersant, which is useful in the practice of this invention and features the present invention primarily, is the specific polyester compound defined above.

The term "a residuum of at least two benzene rings coupled together, an aromatic ring having at least 8 carbon atoms or a heterocyclic ring having at least 8 carbon atoms" as used herein embraces all residua of such a sort known to date, for example, residua derived from diphenylmethane, diphenylethane, diphenylpropane, diphenyl ether, diphenylmethyl ether, diphenyl sulfone, stilbene, biphenyl, naphthalene, fluorene, anthracene, acenaphthene, coumarin, quinoline and carbazole.

In order to introduce the above-mentioned residuum of said at least two benzene rings, said aromatic ring having at least 8 carbon atoms or said heterocyclic ring into the polyester compound, it is only necessary to prepare the polyester by using a mono- or poly-alcohol, a mono- or poly-phenol, a mono- or poly-carboxylic acid or an acid chloride or acid anhydride thereof, or a compound containing at least one hydroxyl group and at least one carboxyl group, which alcohol, phenol, acid, acid chloride, acid anhydride, which contains the residuum. As compounds having such high carbon numbers, any one of conventionally-known compounds which fall within the above definition may be used. The following compounds may however be mentioned as preferred examples.

Diphenylmethanecarboxylic acid;
4,4'-Dihydroxydiphenylmethane, 4,4'-dihydroxydiphenylpropane, 4,4'-dioxydiphenylsulfone, and reaction products of these phenols and at least one mole equivalents of epoxy compounds such as ethylene oxide, propylene oxide and epichlorohydrin;
Diphenylcarboxylic acid;
Diphenyldicarboxylic acid;
Oxybiphenyl, and its reaction products with at least one mole equivalents of epoxy compounds such as ethylene oxide, propylene oxide and epichlorohydrin;
Naphthol, dihydroxynaphthalene, methyl 2-hydroxynaphthoate, and their reaction products with at least one mole of epoxy compounds such as ethylene oxide, propylene oxide and epichlorohydrin;

Naphthalenecarboxylic acid;
Naphthalenedicarboxylic acids;
3-Hydroxy-anthracene-2-carboxylic acid;
Anthracenecarboxylic acid;
Anthraquinonecarboxylic acid;
Anthraquinonedicarboxylic acid;
Fluorene alcohol;
Fluorenecarboxylic acid;
Phenanthrenecarboxylic acid;
Acenaphthenecarboxylic acid;
Coumaronecarboxylic acid;
Quinolinecarboxylic acid;
Quinolinedicarboxylic acid;
2-Hydroxydibenzofuran-3-carboxylic acid;
2-Hydroxycarbazole-3-carboxylic acid; and etc.

The polyester compound useful as a dispersant in the present invention can be formed by using an aliphatic, alicyclic or aromatic hydroxycarboxylic acid, polycarboxylic acid or polyalcohol, which has been known and has been used to form a polyester, as needed, as a component additional to the above-described components.

As preferable hydroxycarboxylic acids, may be mentioned, for example, ricinoleic acid, 12-hydroxystearic acid, castor oil fatty acid, hydrogenated castor oil fatty acid, δ-hydroxyvaleric acid, ε-hydroxycaproic acid, p-hydroxyethyloxybenzoic acid, etc.

On the other hand, illustrative examples of usable polycarboxylic acids may include adipic acid, azelaic acid, sebacic acid, hexahydrophthalic anhydride, tetrahydrophthalic anhydride, 3,6-endomethylene-tetrahydrophthalic anhydride ("Nadic Anhydride", trade name), methyl-3,6-endomethylenetetrahydrophthalic anhydride ("Methyl Nadic Anhydride", trade name), hexachloro-endo-methylene-tetrahydrophthalic anhydride ("Het Anhydride", trade name), dodecenyl succinic anhydride, phthalic anhydride, tetrachlorophthalic anhydride, isophthalic acid, terephtalic acid, trimellitic anhydride, pyromellitic anhydride, polymerized rosin, rosin-maleic anhydride addition products, unsaturated fatty acids-maleic anhydride addition products, and so on.

As exemplary polyalcohols useful in the practice of this invention, may be mentioned ethylene glycol, di- -poly-ethylene glycols, propylene glycol, di- -poly-propylene glycols, 1,3-butanediol, tetramethylene glycol, neopentyl glycol, hexamethylene glycol, octamethylene glycol, dihydroxymethyl cyclodecane, dihydroxybenzene, tris(hydroxyethyl)isocyanurate, etc.

Where one or more carboxyl or hydroxyl groups remain at terminals of the resulting polyester, these groups may be esterified with a monoalcohol or monocarboxylic acid as needed.

Illustrative examples of the monoalcohol may include methyl alcohol, ethyl alcohol, propyl alcohol, butyl alcohol, hexyl alcohol, octyl alcohol, dodecyl alcohol, hexadecyl alcohol, octadecyl alcohol, tetracosyl alcohol, hexacosyl alcohol, octadecenyl alcohol, cyclohexyl alcohol, benzyl alcohol and the like. As exemplary monocarboxylic acids, may be mentioned acetic acid, propionic acid, butyric acid, capronic acid, lauric acid, palmitic acid, stearic acid, oleic acid, linoleic acid, linolenic acid, behenic acid, tricyclodecanecarboxylic acid, benzoic acid, rosin, hydrogenated rosin, etc.

The polyesterification reaction and the reaction for introducing the residuum of aromatic or heterocyclic ring(s), in which these various components are used, as well as the esterification reaction with the above-described monoalcohol or monocarboxylic acid may be carried out by methods known per se in the art, for example, by choosing preferable reaction conditions, e.g., in a solventless system or in a solvent solution, in the presence of or in the absence of a catalyst, in a reduced or normal pressure system, in air or a nitrogen gas atmosphere.

No particular limitation is imposed on the molecular weight of the polyester compound to be used in the present invention. Its molecular weight may however range from the molecular weight of a dimer to a polymer having an average molecular weight up to 10,000 with about 500-5,000 being preferred.

Owing to the inclusion of the residuum of said at least two benzene rings coupled together, the aromatic ring of the high carbon number or the heterocyclic ring in its molecule, the above-described polyester compound features its markedly increased hydrophobicity or lipophilicity and its significantly improved compatibility with pigments, especially, organic pigments.

When a pigment is treated with such a polyester compound, the polyester compound has high compatibility with the pigment and renders the surface of the pigment very hydrophobic or lipophilic. As a result, the thus-treated pigment has high compatibility with oil media.

Polyester compounds useful in the practice of this invention were obtained by using hydroxy derivatives, which had in turn been obtained by reacting epoxy compounds with compounds containing coupled benzene rings, an aromatic ring of a high carbon number or a heterocyclic ring such as that mentioned above. Still better effects were exhibited from the use of such polyester compounds as agents for treating pigments.

Any conventionally-known pigments may be used in the present invention, including organic pigments, inorganic pigments, extender pigments, etc.

For example, illustrative examples of organic pigments may include phthalocyanine pigments, azo pigments, condensed azo pigments, anthraquinone pigments, perinone/perylene pigments, indigo/thioindigo pigments, isoindolinone pigments, azomethineazo pigments, dioxazine pigments, quinacridone pigments, aniline black pigments, triphenylmethane pigments, carbon black and the like. As exemplary inorganic pigments, may be mentioned titanium oxide pigments, iron oxide pigments, iron hydroxide pigments, chromium oxide pigments, calcined spinel pigments, lead chromate pigments, chromium vermillion pigments, iron blue pigments, aluminum powder, bronze powder, etc. As extender pigments, may be mentioned calcium carbonate pigments, barium sulfate pigments, silicon oxide pigments and aluminum hydroxide pigments by way of example.

In the present invention, these pigments may be used in the form of aqueous filter cakes or aqueous suspensions, in addition to dried fine powdery forms.

The pigment composition of this invention can be obtained by incorporating such a polyester compound as described above in a proportion of about 1–300 parts by weight, preferably, about 3– about 150 parts by weight based on 100 parts by weight of such a pigment as described above. Needless to say, it is also possible to add a conventionally-known suitable organic solvent, binder resin such as vehicle for oil-based paints, varnish for oil-based printing inks or vehicle for oil-based coating formulations, thermoplastic resin, thermosetting resin, plasticizer, crosslinking agent, catalyst and/or the like concurrently upon mixing these two components, thereby obtaining a paint, printing ink or the like directly.

Any conventionally-known method may be used to mix these essential and optional components and to obtain the pigment composition of this invention. It is a typical method to mix, knead and comminute them, for example, in a conventionally-known disperser such as ball mill, sand mill, attritor, horizontal continuous medium disperser, two-roll mill, three-roll mill, pressurized kneader, Banbury mixer or extruder.

When the pigment is used in the form of an aqueous filter cake or aqueous suspension in particular, the dispersant useful in the practice of this invention is added to and mixed with the pigment either singly or preferably in the form of a solution in a hydrophobic organic solvent (which may optionally contain a binder for printing inks or paints), whereby the pigment is caused to transfer from the aqueous phase to the organic solvent phase so as to obtain a pigment composition of this invention.

The pigment composition of this invention may take the following forms:

(1) A composition containing a pigment at a high concentration, which is useful as a colorant for printing inks, paints, coating formulations, synthetic resins, etc. In this form, the concentration of the pigment ranges from 20% to 95%, while the concentration of the dispersant useful in the practice of this invention is 1-300 wt. % based on the pigment (2) A composition which contains a solvent, binder resin and the like, which are required to formulate paints, dispersants and coating formulations, and is useful as paints and the like. In this composition, the pigment concentration is 0.1-20 wt. % and the dispersant concentration ranges from 1 to 300 wt. % of the pigment.

Paints making use of conventionally-known pigments are all included, for example, automotive paints, construction paints, wood paints, vehicle and equipment paints, household paints, plastic-coating paints, paints for precoated metals, can paints, ship paints, corrosion-resistant paints, photo-setting paints, electron radiation curing paints, electrostatic powder coating paints, vinyl sols, etc.

On the other hand, conventionally-known printing inks are all included, for example, letterpress inks, lithographic inks, intaglio gravure inks, screen printing inks, news inks, flexographic inks, etc.

Pigment compositions in such various forms as described above may be either solid or liquid. In liquid forms, water, mixed solvents of water and hydrophilic organic solvents and organic solvents are used as media. As exemplary organic solvents, may be used aliphatic solvents, alicyclic solvents, aromatic hydrocarbons, halogenated hydrocarbons, esters, ketones, glycol ethers, alcohols, etc. No particular limitation is imposed.

As vehicles for paints, varnishes for printing inks, vehicles for coating formulations and the like, conventionally-known oily or aqueous binders may be used depending on individual applications, for example, including, e.g., long, medium and short oil length alkyd resins, modified alkyd resins such as phenol-modified alkyd resins and styrenated alkyd resins, aminoalkyd resins, oil-free alkyd resins, baking acrylic resins, acrylic lacquer resins, acrylic polyol resins, polyester resins, epoxy resins, butylated melamine resins, methylated melamine resins, urea-melamine resins, phenol resins, rosin-modified phenol resins, rosin-modified maleic acid resins, phenol-modified maleic acid resins, polyurethane resins, styrene resins, styrene-acrylic resins, styrene-diene copolymers, vinyl chloride copolymers, vinyl acetate resins, vinyl acetate copolymers, ethylene-vinyl acetate resins, butyral resins, petroleum resins, modified resins such as rosin esters and maleinized rosin esters, drying oils and blown oils.

Illustrative examples of thermoplastic resins may include polyvinyl chloride resin, styrene resin, acrylonitrile-styrene resins, acrylic resins, methacrylic-styrene resins and polyester resins.

As exemplary plasticizers, may be mentioned phthalic esters, adipic esters, sebacic esters, polyester plasticizers, epoxylated soybean oil, etc.

The attainment of this invention will not be impeded by the use of a conventionally-known dispersant or flushing agent for pigments as needed, for example, by the combined use of a higher aliphatic primary, secondary or tertiary monoamine, a higher aliphatic quaternary ammonium or a higher aliphatic propylene diamine or the acetic acid or a higher fatty acid salt thereof.

The present invention will next be described specifically by the following Referential Examples and Examples, in which all designations of "part" or "parts" and "%" are by weight unless otherwise specifically indicated.

REFERENCE EXAMPLE 1

Provided were a glass-made 4-neck reactor, which had a stirrer, a thermometer, a reflux condenser fitted with a moisture distilling tube and a charging port, and an oil bath. The reactor was then charged with 60 parts of "Methyl Nadic Anhydride", 30 parts of butylene glycol, 301 parts of 12-hydroxystearic acid, 67 parts of 2-naphthoxyacetic acid and 153 parts of toluene. The contents were stirred into a solution. After the dissolution, the resultant solution was heated and 6.9 parts of p-toluenesulfonic acid was added as a condensation catalyst. The reaction mixture was heated to 120° C., at which a polyesterification reaction was allowed to proceed. The progress of the reaction was monitored by amounts of water distilled and infrared absorption spectra of the reaction mixture. Seven hours later, the reaction mixture was cooled to terminate the reaction.

The catalyst was then neutralized with an alkali, toluene was distilled off and methanol was added to extract and wash the thus-neutralized catalyst. The methanol was distilled off and the reaction product was cooled to 10° C. or lower. The thus-obtained reaction product was a liquid of an amber color. By an infrared absorption spectrum and an analysis chart of gel permeation chromatography, the reaction product was found to contain as its principal component an ester of a polyester, which was a co-condensation product of 12-hydroxystearic acid-Methyl Nadic Acid-butylene glycol, with 2-naphthoxyacetic acid (Dispersant 1). The average molecular weight of the principal component was 1,150–1,300.

Reactions were conducted in the same manner as in Reference Example 1, thereby obtaining the following dispersants:

Dispersant 2

A reaction product of a co-condensation polyester of Methyl Nadic Anhydride-butylene glycol-12-hydroxystearic acid (molar ratio: 1:1:3) with naphthyl-1-acetic acid (average molecular weight of the principal component 1,150–1,300).

Dispersant 3

A reaction product of a co-condensation polyester of Methyl Nadic Anhydride-butylene glycol-12-hydroxystearic acid (molar ratio: 1:1:2) with tetraethyleneglycol-2-naphthyl ether (average molecular weight of the principal component: 1,000–1150).

Dispersant 4

A reaction product of a co-condensation polyester of Methyl Nadic Anhydride-butylene glycol-12-hydroxystearic acid (molar ratio: 1:1:3) with diethyleneglycol-2-naphthyl ether (average molecular weight of the principal component: 1,200–1,350).

Dispersant 5

A reaction product of a co-condensation polyester of Methyl Nadic Anhydride-butylene glycol-12-hydroxystearic acid (molar ratio: 1:1:2) with dipropyleneglycol-2-naphthyl ether (average molecular weight of the principal component: 950–1,100).

Dispersant 6

A reaction product of a co-condensation polyester of Methyl Nadic Anhydride-butylene glycol-12-hydroxystearic acid (molar ratio: 1:1:3) with naphthalene-1,8-dicarboxylic acid (average molecular weight of the principal component: 1,150–1,300).

Dispersant 7

A reaction product of a co-condensation polyester of Methyl Nadic Anhydride-butylene glycol-12-hydroxystearic acid (molar ratio: 2:2:2) with 2,2-bis(hydroxypropoxyphenyl)propane (average molecular weight of the principal component: 1,250–1,450).

Dispersant 8

A reaction product of a co-condensation polyester of Methyl Nadic Anhydride-butylene glycol-12-hydroxystearic acid (molar ratio: 1:1:1) with tetraethyleneglycol-2-naphthyl ether (average molecular weight of the principal component: 750–900).

Dispersant 9

A reaction product of a co-condensation polyester of Methyl Nadic Anhydride-butylene glycol-ricinoleic acid (molar ratio: 1:1:3) with 2-naphthoxyacetic acid (average molecular weight of the principal component: 1,150–1,300).

Dispersant 10

A reaction product of a co-condensation polyester of Methyl Nadic Anhydride-butylene glycol-ricinoleic acid (molar ratio: 1:1:3) with tetraethyleneglycol-2-naphthyl ether (average molecular weight of the principal component: 1,250–1,450).

Dispersant 11

A reaction product of a co-condensation polyester of hexahydrophthalic anhydride-butylene glycol-12-hydroxystearic acid (molar ratio: 2:2:2) with tetraethyleneglycol-2-naphthyl ether (average molecular weight of the principal component: 1,200–1,350).

Dispersant 12

A reaction product of a co-condensation polyester of phthalic anhydride-butylene glycol-12-hydroxystearic acid (molar ratio: 2:2:2) with tetraethyleneglycol-2-naphthyl ether (average molecular weight of the principal component: 1,200–1,350).

Dispersant 13

A reaction product of a co-condensation polyester of hexahydrophthalic anhydride-butylene glycol (molar ratio: 2:2) with tetraethyleneglycol-2-naphthyl ether (average molecular weight of the principal component: 700–800).

Dispersant 14

A reaction product of a self-condensed polyester of 12-hydroxystearic acid with tetraethyleneglycol-2-naphthyl ether (average molecular weight of the principal component: 1,500–1,750).

Dispersant 15

A reaction product of a self-condensed polyester of 12-hydroxystearic acid with pentaethyleneglycol-2-naphthyl ether (average molecular weight of the principal component: 1,600–1,800).

Dispersant 16

A reaction product of a self-condensed polyester of ricinoleic acid with tetraethyleneglycol-2-naphthyl ether (average molecular weight of the principal component: 1,550–1,750).

Dispersant 17

A reaction product of a self-condensed polyester of ricinoleic acid with tetraethyleneglycol-2-naphthyl ether (average molecular weight of the principal component: 800–900).

Dispersant 18

A reaction product of a self-condensed polyester of 12-hydroxystearic acid with tetraethyleneglycolphenyl ethylphenyl ether (average molecular weight of the principal component: 1,600–1,800).

EXAMPLE 1

Charged in a flusher were 238 parts of an aqueous filter cake (pigment content: 42%) of Copper phthalocyanine blue pigment (C.I. Pigment Blue 15-3), followed by an addition of a solution of 40 parts of Dispersant 1 in 38.5 parts of petroleum ink solvent. The resultant mixture was kneaded by a method known per se in the art to effect flushing. In that flushing, water was released readily from the cake and Copper phthalocyanine pigment was allowed move into an oil phase of the dispersant.

Water was then removed completely to obtain a flushed color which contained Copper phthalocyanine blue pigment. An offset ink was prepared using the above-obtained flushed color which contained Copper phthalocyanine blue pigment.

|  | Parts |
| --- | --- |
| Flushed color (pigment content: 56%) of Copper phthalocyanine blue pigment, obtained above | 34.8 |
| Mixed varnish for offset | 63.0 |

-continued

| | Parts |
|---|---|
| lithographic inks | |
| 5% Cobalt drier | 0.2 |
| 8% Manganese drier | 1.0 |
| Ink solvent | 1.0 |
| TOTAL | 100.0 |

In the above formulation, the mixed varnish for offset inks had the following composition.

| | Parts |
|---|---|
| Rosin-modified phenol resin | 35 |
| Drying oil | 25 |
| Drying oil modified isophthalic acid alkyd | 10 |
| Ink solvent | 29.5 |
| Aluminum chelate | 0.5 |
| TOTAL | 100.0 |

Uncoated printing paper sheets were printed with the above-obtained ink by an offset press, thereby obtaining prints of a vivid cyan color.

Following the above-described procedure, additional flushed colors were also prepared using an aqueous filter cake (pigment content: 27%) of Disazo yellow pigment (C.I. Pigment Yellow 12) and an aqueous filter cake (pigment content: 25%) of Brilliant carmine 6B pigment (C.I. Pigment Red 57-1) separately, followed by their formulation into offset inks of yellow and magenta colors.

Similarly, a further flushed color was obtained from an aqueous filter cake of Lake red C pigment (C.I. Pigment Red 53-1), followed by its formulation into an offset ink of a bronze red color. In addition, a still further flushed color was obtained from an aqueous filter cake of Copper phthalocyanine green pigment (C.I. Pigment Green 7), followed by its formulation into an offset ink of a green color.

In each of the above flushing operations, the separation of water was easy and efficient movement of the pigment was observed. The formulation of the inks was easy. By offset lithographic printing with these inks, vivid prints of excellent quality were obtained.

The above procedure was repeated using Dispersant 2–Dispersant 18 separately in lieu of Dispersant 1. Similar excellent effects were also observed.

| | Parts |
|---|---|
| Carbon black pigment | 20 |
| Dispersant 1 | 10 |
| Mixed varnish for offset lithographic ink | 65 |
| TOTAL | 95 |

In a three-roll mill, carbon black pigment was kneaded and dispersed in accordance with the above-described composition. The carbon black pigment was dispersed very well in the varnish.

| | Parts |
|---|---|
| Varnish dispersion of carbon black pigment, obtained above | 95 |
| 5% Cobalt drier | 0.2 |
| 8% Manganese drier | 1.0 |
| Ink solvent | 3.8 |

| | Parts |
|---|---|
| TOTAL | 100.0 |

The above components were mixed and kneaded homogeneously to obtain a carbon black ink. Printing was performed with the carbon black ink by an offset press to obtain prints of a black color having a high blackness. The above procedure was repeated using Dispersant 2–Dispersant 18 separately in lieu of Dispersant 1. Similar excellent effects were also observed.

Using the yellow ink, magenta ink and cyan inks obtained in Example 1 together with the jet black ink obtained above as offset lithographic process inks of yellow, magenta, cyan and black colors, four-color process printing was performed. Vivid and beautiful multicolor prints were obtained.

EXAMPLE 3

| | Parts |
|---|---|
| Flushed color (pigment content: 56%) of Copper phthalocyanine blue pigment, obtained in Example 1 | 9.6 |
| Rutile-type titanium white | 2.0 |
| Rapid-drying styrenated alkyd resin | 72.6 |
| Xylol | 6.6 |
| Mineral spirit | 8.8 |
| 6% Cobalt naphthenate | 0.3 |
| Anti-skinning agent | 0.1 |
| TOTAL | 100.0 |

The above components were thoroughly mixed and dispersed to obtain a room-temperature curable rapid-drying enamel of a blue color for metal materials such as machines and vehicles. Upon application of the enamel, vivid and beautiful coating was performed.

The above procedure was repeated using Dispersant 2–Dispersant 18 separately in lieu of Dispersant 1. Similar excellent effects were also observed.

Using aqueous filter cakes of pigments of Disazo yellow (C.I. Pigment Yellow 14), a fast yellow pigment obtained by diazotizing 4-aminophthalimide and then coupling the reaction product with acetoacetanilide, Watchung red (C.I. Pigment Red 48) and Carmine FB (C.I. Pigment Red 3) instead of Copper phthalocyanine blue pigment of Example 1, flushing operations were separately carried out in the same manner as in Example 1 to obtain flushed colors of the respective pigments.

The flushed colors were separately used in place of copper phthalocyanine pigment in the above paint composition, thereby obtaining paints of the respective colors. Vivid and beautiful coated plates were obtained.

EXAMPLE 4

| | Parts |
|---|---|
| Dry ground pigment of Copper phthalocyanine blue pigment (C.I. Pigment Blue 15-3) | 10 |
| Dispersant 1 | 5 |
| Xylol | 11 |
| Butanol | 4 |
| TOTAL | 30 |

The above components were dispersed in a continuous horizontal medium disperser to obtain a dispersion of Copper phthalocyanine blue pigment in a xylol-butanol mixed solvent.

A paint was then formulated in accordance with the following composition.

|  | Parts |
|---|---|
| Solvent dispersion of Copper phthalocyanine blue and Dispersion 1, obtained above | 3 |
| Rutile-type titanium white | 14 |
| Thermoplastic acrylic resin | 70 |
| Toluol | 6.8 |
| Xylol | 3.2 |
| Butanol | 2.2 |
| Cellosolve | 0.8 |
| TOTAL | 100.0 |

The above formulation was applied as an automotive acrylic lacquer enamel, thereby obtaining vivid and beautiful coating.

Similar excellent paints were also obtained from the separate use of Dispersant 2–Dispersant 18 in lieu of Dispersant 1.

We claim:

1. A pigment composition containing a pigment and a dispersant, characterized in that said dispersant is a wax, paste or liquid polyester compound which contains, per molecule, a residuum of at least two benzene rings coupled together, an aromatic ring, said ring having at least 8 carbon atoms or a heterocyclic ring, said ring having at least 8 carbon atoms and at least one ester bond as a principal bond.

2. The pigment composition as claimed in claim 1, wherein said residuum is a residuum derived from diphenylmethane, diphenylethane, diphenylpropane, diphenyl ether, diphenylmethyl ether, diphenyl sulfone, stilbene, biphenyl, naphthalene, fluorene, anthracene, acenaphthene, coumarin, quinoline and carbazole.

3. The pigment composition as claimed in claim 1, wherein said residuum has been introduced into the polyester compound from a mono- or poly-alcohol, a mono- or poly-phenol, a mono- or poly-carboxylic acid, a compound containing at least one hydroxyl group and at least one carboxyl group therein, or a derivative thereof.

* * * * *